(12) United States Patent
Kokaki (10) Patent No.: US 11,904,935 B2
(45) Date of Patent: Feb. 20, 2024

(54) VEHICLE CONTROL APPARATUS, VEHICLE, OPERATION METHOD FOR VEHICLE CONTROL APPARATUS, AND STORAGE MEDIUM

(71) Applicant: HONDA MOTOR CO., LTD., Tokyo (JP)

(72) Inventor: Toru Kokaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 362 days.

(21) Appl. No.: 17/181,177

(22) Filed: Feb. 22, 2021

(65) Prior Publication Data
US 2021/0284234 A1   Sep. 16, 2021

(30) Foreign Application Priority Data

Mar. 16, 2020   (JP) ................. 2020-045508

(51) Int. Cl.
*B62D 15/02* (2006.01)
*B60W 50/14* (2020.01)
(Continued)

(52) U.S. Cl.
CPC ........... *B62D 15/025* (2013.01); *B60W 50/14* (2013.01); *G01C 21/3807* (2020.08);
(Continued)

(58) Field of Classification Search
CPC . B62D 15/025; G01C 21/3807; B60W 50/14; B60W 2556/45; B60W 2540/223; B60W 2556/60; B60W 2050/0075
See application file for complete search history.

(56) References Cited

U.S. PATENT DOCUMENTS 8,849,517 B2    9/2014 Kluge
10,102,760 B1 * 10/2018 Foltan .................... G10L 25/51
(Continued)

FOREIGN PATENT DOCUMENTS

| CN | 101016052 A | 8/2007 |
| CN | 101032405 A | 9/2007 |

(Continued)

OTHER PUBLICATIONS

Japanese Office Action (with partial translation) for Japanese Patent Application No. 2020-045508 dated Jan. 28, 2022.
(Continued)

*Primary Examiner* — Behrang Badii
*Assistant Examiner* — Jay Khandpur
(74) *Attorney, Agent, or Firm* — Thomas| Horstemeyer, LLP (57) ABSTRACT

A vehicle control apparatus for controlling a vehicle based on surrounding area information of the vehicle, comprising: a control unit capable of controlling the vehicle in a first state in which gripping of a steering apparatus by a driver of the vehicle is needed and a second state in which the gripping is not needed, based on the surrounding area information; and a warning output unit configured to output a deviation warning when the vehicle has approached a boundary of a travel path, wherein if the vehicle is in the second state, the control unit suppresses output of the deviation warning performed by the warning output unit compared to a case where the vehicle is in the first state.

13 Claims, 4 Drawing Sheets

(51) Int. Cl.
*G01C 21/00* (2006.01)
*B60W 50/00* (2006.01)

(52) U.S. Cl.
CPC ............... *B60W 2050/0075* (2013.01); *B60W 2540/223* (2020.02); *B60W 2556/45* (2020.02); *B60W 2556/60* (2020.02)

(56) References Cited

U.S. PATENT DOCUMENTS

| | | | |
|---|---|---|---|
| 2005/0065721 A1* | 3/2005 | Herrtwich | G01C 21/3632 701/408 |
| 2012/0191266 A1 | 7/2012 | Kluge | |
| 2015/0065161 A1* | 3/2015 | Ganesh | H04W 4/027 455/456.1 |
| 2015/0161881 A1* | 6/2015 | Takemura | G08G 1/165 348/148 |
| 2016/0003630 A1* | 1/2016 | Higuchi | G08G 1/167 701/41 |
| 2018/0345964 A1* | 12/2018 | Fujii | B60W 50/14 |
| 2020/0065597 A1* | 2/2020 | Bade | B60W 40/08 |
| 2020/0148226 A1* | 5/2020 | Kim | B60W 50/0097 |
| 2020/0377126 A1 | 12/2020 | Obata et al. | |

FOREIGN PATENT DOCUMENTS

| | | |
|---|---|---|
| CN | 102602452 A | 7/2012 |
| CN | 109791054 A | 5/2019 |
| DE | 102005027642 A1 | 12/2006 |
| JP | 2018-149974 A | 9/2018 |
| WO | 2018/066028 A1 | 4/2018 |

OTHER PUBLICATIONS

Chinese Office Action for Chinese Patent Application No. 202110207864.0 dated Jul. 12, 2023.

* cited by examiner

VEHICLE CONTROL APPARATUS, VEHICLE, OPERATION METHOD FOR VEHICLE CONTROL APPARATUS, AND STORAGE MEDIUM

CROSS-REFERENCE TO RELATED APPLICATION(S)

This application claims priority to and the benefit of Japanese Patent Application No. 2020-0455508 filed on Mar. 16, 2020, the entire disclosure of which is incorporated herein by reference.

BACKGROUND OF THE INVENTION

Field of the Invention

The present invention relates to a vehicle control apparatus, a vehicle, an operation method for a vehicle control apparatus, and a storage medium.

Description of the Related Art

Japanese Patent Laid-Open No. 2018-149974 discloses a lane deviation suppression apparatus that performs a deviation suppression operation for suitably suppressing deviation of a vehicle from a travel lane.

However, with the technique disclosed in Japanese Patent Laid-Open No. 2018-149974, when a deviation warning that is output when the vehicle approaches a boundary of a travel path is inadvertently reported in a state in which gripping of a steering apparatus is not necessary, it is difficult for a driver to understand how to respond, and the driver is given a sense of unease in some cases.

The present invention was made in view of the foregoing problem, and provides a technique for suppressing output of an excessive deviation warning in a state in which gripping of a steering apparatus is not needed.

SUMMARY OF THE INVENTION

According to one aspect of the present invention, there is provided a vehicle control apparatus for controlling a vehicle based on surrounding area information of the vehicle, comprising: a control unit capable of controlling the vehicle in a first state in which gripping of a steering apparatus by a driver of the vehicle is needed and a second state in which the gripping is not needed, based on the surrounding area information; and a warning output unit configured to output a deviation warning when the vehicle has approached a boundary of a travel path, wherein if the vehicle is in the second state, the control unit suppresses output of the deviation warning performed by the warning output unit compared to a case where the vehicle is in the first state.

DESCRIPTION OF THE EMBODIMENTS

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Figure 1:
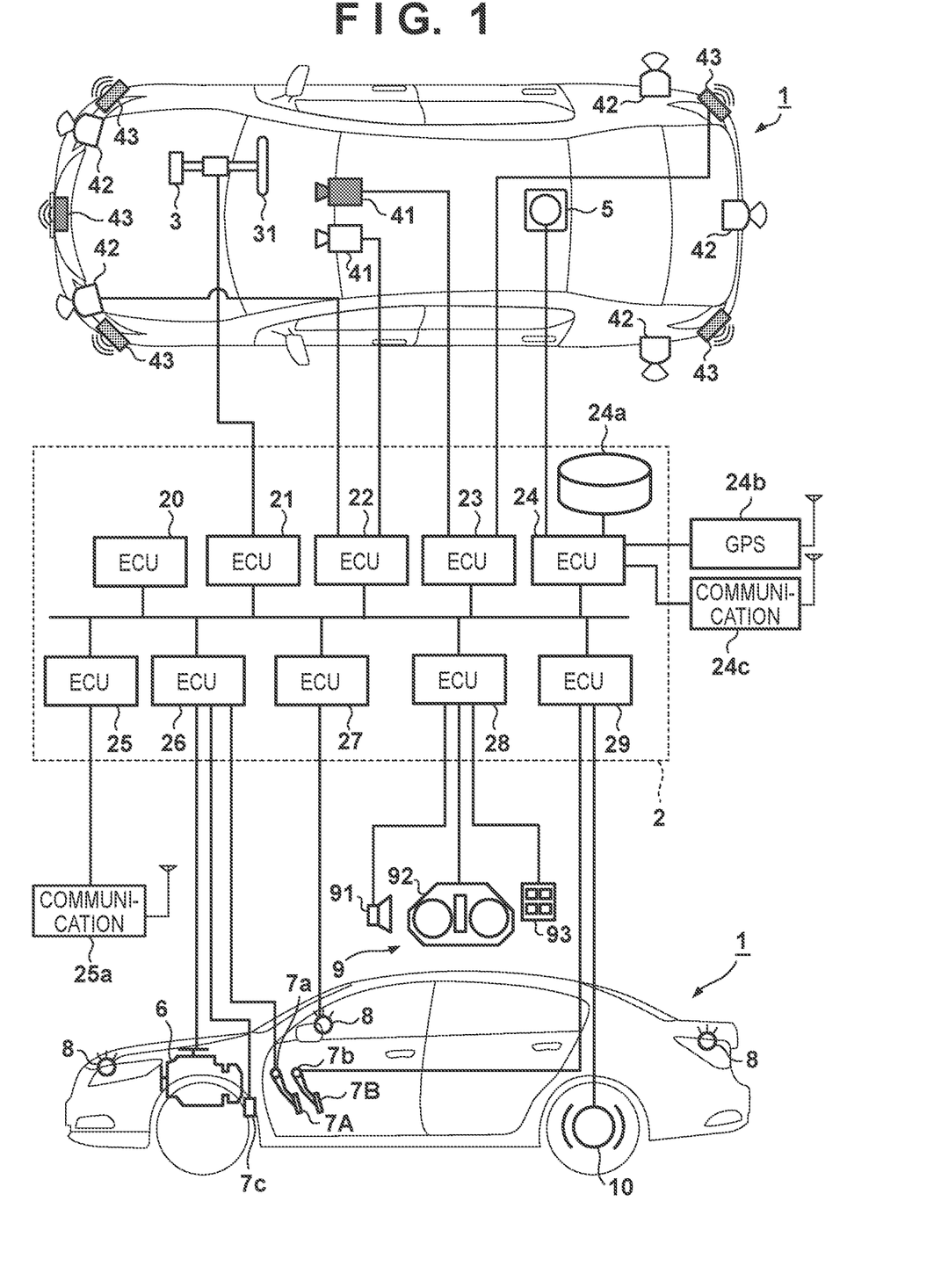
FIG. 1 is a block diagram showing a vehicle and a vehicle control apparatus according to a first embodiment.

FIG. 1 is a block diagram of a vehicle and a vehicle control apparatus according to an embodiment of the present invention. In FIG. 1, an overview of a vehicle 1 is shown in a plan view and a side view. The vehicle 1 is, for example, a sedan-type four-wheel passenger car.

The vehicle control apparatus shown in FIG. 1 includes a control unit 2. The control unit 2 includes multiple ECUs 20 to 29 that are communicably connected through an intra-vehicle network. Each ECU includes a processor represented by a CPU, a storage device such as a semiconductor memory, an interface with an external device, and the like. Programs to be executed by the processor, data to be used by the processor for processing, and the like are stored in the storage device. Each ECU may also include multiple processors, storage devices, interfaces, and the like.

Hereinafter, functions and the like executed by the ECUs 20 to 29 will be described. Note that the number of ECUs and the functions executed thereby can be designed as appropriate, and can be further divided or integrated compared to the present embodiment.

The ECU 20 executes control relating to automatic driving or driving assistance of the vehicle 1. The ECU 20 automatically controls at least one of the steering and acceleration/deceleration of the vehicle 1 according to the driving mode. The driving mode is set in correspondence with a so-called automatic driving level. For example, the automatic driving levels include level 0 (L0), level 1 (L1), level 2A (L2A), level 2B (L2B), level 3 (L3), level 4 (L4), and the like.

The definitions of the levels are as follows. Note that in the following description, ACC means adaptive cruise control, and LKAS means lane keeping assist system.

L0: Driving assistance is substantially not performed.

L1: One of ACC and LKAS in driving assistance is performed.

L2A: Both ACC and LKAS in driving assistance are executed, and the driver needs to grip a steering wheel 31.

L2B: Both ACC and LKAS in driving assistance are executed, and the driver does not need to grip the steering wheel 31.

L3: Duties of the driver relating to a driving operation are relieved more than in L2B, and a surrounding area observation duty does not need to be performed by the driver.

The degree of automation increases sequentially from L0 to L3, and in the present embodiment, L2A is referred to as a first state, and L2B is referred to as a second state. Note that here, L0, L1, L2A, L2B, and L3 are shown as examples of automatic driving levels, but another level (e.g., a mode L4 or the like in which the degree of driving assistance is greater than in the mode L3) may also be further included.

The ECU 21 controls an electric power steering apparatus 3. The electric power steering apparatus 3 includes a mechanism for steering the front wheels according to a driving operation (steering operation) performed by the driver on the steering wheel 31. Also, the electric power steering apparatus 3 includes a motor that assists a steering operation or exhibits a driving force for automatically steering the front wheels, a sensor for detecting a steering angle, and the like. If the driving state of the vehicle 1 is automatic driving, the ECU 21 automatically controls the electric power steering apparatus 3 in correspondence with an instruction from the ECU 20, and controls the advancement direction of the vehicle 1.

The ECUs 22 and 23 perform control of detection units 41 to 43 for detecting the state of the surrounding area of the vehicle and information processing of the detection results. The detection unit 41 is a camera that performs image capture in a frontward direction of the vehicle 1 (hereinafter written as "camera 41" in some cases), and in the case of the present embodiment, the detection unit 41 is attached on the vehicle interior side of a front window at the front portion of the roof of the vehicle 1. An outline of a target can be extracted, or a demarcation line (white line, etc.) for a lane on the road can be extracted through analysis of the image captured by the camera 41.

The detection unit 42 is Light Detection and Ranging (LIDAR) (hereinafter written as "lidar 42" in some cases), detects a target in the surrounding area of the vehicle 1, and measures the distance to the target. In the case of the present embodiment, five lidars 42 are provided, one lidar 42 being provided at each corner of the front portion of the vehicle 1, one being provided in the center of the rear portion, and one being provided on each side of the rear portion. The detection unit 43 is a millimeter-wave radar (hereinafter written as "radar 43" in some cases), and the detection unit 43 detects a target in the surrounding area of the vehicle 1 and measures the distance to the target. In the case of the present embodiment, five radars 43 are provided, one being provided in the center of the front portion of the vehicle 1, one being provided at each corner of the front portion, and one being provided at each corner of the rear portion.

The ECU 22 performs control of one camera 41 and the lidars 42, and performs information processing of the detection results. The ECU 23 performs control of the other camera 41 and the radars 43, and performs information processing of the detection results. By including two sets of apparatuses for detecting the state of the surrounding area of the vehicle, it is possible to improve the reliability of the detection results, and by including different types of detection units such as cameras, lidars, and radars, it is possible to perform multi-faceted analysis of the surrounding environment of the vehicle.

The ECU 24 performs control of a gyrosensor 5, a GPS sensor 24b, and a communication apparatus 24c, and information processing of the detection results or communication results. The gyrosensor 5 detects rotational movement of the vehicle 1. The path of the vehicle 1 can be determined using the detection results of the gyrosensor 5, wheel speed, and the like. The GPS sensor 24b detects the current position of the vehicle 1. The communication apparatus 24c acquires map information and traffic information by performing wireless communication with a server that provides these pieces of information. The ECU 24 can access a database 24a of map information constructed in a storage device, and the ECU 24 performs route searching and the like from a current location to a target location.

The ECU 25 includes a communication apparatus 25a for inter-vehicle communication. The communication apparatus 25a performs wireless communication with another vehicle in the surrounding area, and information exchange is performed between the vehicles.

The ECU 26 controls a power plant 6. The power plant 6 is a mechanism that outputs a driving force for rotating the driving wheels of the vehicle 1, and for example, includes an engine and a transmission. For example, the ECU 26 controls the output of the engine in correspondence with a driving operation (accelerator operation or acceleration operation) performed by the driver, which is detected by an operation detection sensor 7a provided in an accelerator pedal 7A, and switches the gear ratio of the transmission based on information such as the vehicle speed detected by a vehicle speed sensor 7c. If the driving state of the vehicle 1 is automatic driving, the ECU 26 automatically controls the power plant 6 in correspondence with an instruction from the ECU 20, and controls the acceleration/deceleration of the vehicle 1.

The ECU 27 controls lighting devices (headlights, tail lights, etc.) including direction indicators 8 (blinkers). In the case of the example shown in FIG. 1, the direction indicators 8 are provided on the front portion, the door mirrors, and the rear portion of the vehicle 1.

The ECU 28 performs control of the input/output apparatus 9. The input/output apparatus 9 performs output of information to the driver and reception of input of information from the driver. An audio output apparatus 91 reports information through audio to the driver. A display apparatus 92 reports information through display of an image to the driver. For example, the display apparatus 92 is arranged in front of the driver's seat, and is included in an instrument panel and the like. Note that here, although audio and display have been shown as examples, information may also be reported using vibration or light. Information may also be reported using a combination of any of audio, display, vibration, and light. Furthermore, the combination may be changed or the reporting mode may be changed according to the level (e.g., urgency level) of the information to be reported. Although an input apparatus 93 is a group of switches that are arranged at a position at which they can be operated by the driver, and perform instructions to the vehicle 1, an audio input apparatus may also be included.

The ECU 29 controls a brake apparatus 10 and a parking brake (not shown). The brake apparatus 10 is, for example, a disc brake apparatus, is provided on the wheels of the vehicle 1, and decelerates or stops the vehicle 1 by adding resistance to the rotation of the wheels. For example, the ECU 29 controls the operation of the brake apparatus 10 in correspondence with a driving operation (brake operation) performed by the driver, which is detected by an operation detection sensor 7b provided in a brake pedal 7B. If the driving state of the vehicle 1 is automatic driving, the ECU 29 automatically controls the brake apparatus 10 and controls the deceleration and stopping of the vehicle 1 in correspondence with an instruction from the ECU 20. The brake apparatus 10 and the parking brake can operate in order to maintain the stopped state of the vehicle 1. Also, if the transmission of the power plant 6 includes a parking lock mechanism, this can also operate in order to maintain the stopped state of the vehicle 1.

Processing

First, control relating to the automatic driving of the vehicle 1 executed by the ECU 20 will be described. When the target location and automatic driving are instructed by the driver, the ECU 20 automatically controls the driving of the vehicle 1 toward the target location in accordance with a guidance route found by the ECU 24. During automatic control, the ECU 20 acquires information relating to the state of the surrounding area of the vehicle 1 from the ECUs 22 and 23, and instructs the ECUs 21, 26, and 29 to control the steering and/or acceleration and deceleration of the vehicle 1 based on the acquired surrounding area information.

Figure 2:
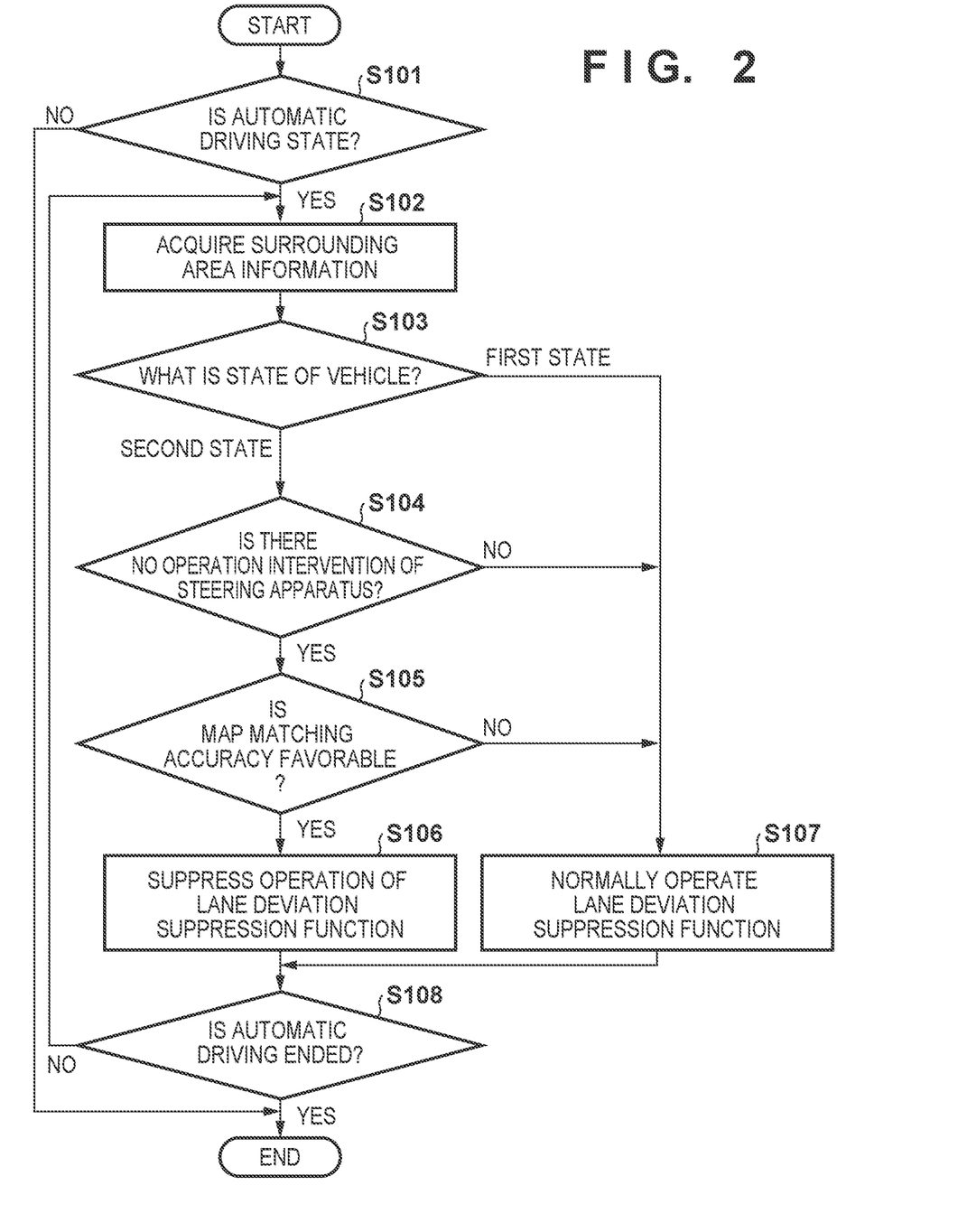
FIG. 2 is a flowchart showing an example of automatic driving processing according to the first embodiment.

Next, FIG. 2 is a flowchart showing a procedure of processing carried out by the vehicle control apparatus according to the present embodiment. The processing content of this flowchart is mainly performed by the ECU 20.

In step S101, the ECU 20 determines whether or not the vehicle 1 is in an automatic driving state. If the vehicle 1 is in the automatic driving state, the processing advances to step S102. On the other hand, if the vehicle 1 is not in the automatic driving state, the present flowchart ends. In step S102, the ECU 20 acquires the surrounding area information of the vehicle 1 from the ECUs 22 and 23.

In step S103, the ECU 20 determines the control state of the vehicle 1. Specifically, the ECU 20 determines whether the vehicle 1 is in a first state in which gripping of a steering apparatus (e.g., the steering wheel 31) by the driver of the vehicle 1 is needed and the steering and acceleration/deceleration of the vehicle 1 are controlled automatically, or in a second state in which the gripping is not needed and the steering and acceleration/deceleration of the vehicle 1 are controlled automatically. If the vehicle 1 is in the second state, the processing advances to step S104. On the other hand, if the vehicle 1 is in the first state, the processing advances to step S107.

In step S104, the ECU 20 determines whether or not there is no intervention operation on the steering apparatus (e.g., the steering wheel 31) by the driver of the vehicle 1. If an intervention operation is being performed, the processing advances to step S107. On the other hand, if an intervention operation is not being performed, the processing advances to step S105.

In step S105, the ECU 20 determines whether or not a map matching accuracy is favorable. Specifically, the ECU 20 calculates the degree of reliability of the position information of vehicle 1 based on the surrounding area information and determines that the map matching accuracy is not favorable if the calculated degree of reliability is less than a predetermined value. On the other hand, if the degree of reliability is a predetermined value or more, the ECU 20 determines that the map matching accuracy is favorable.

For example, the ECU 20 acquires shape information of the travel path of the vehicle 1 based on the surrounding area information acquired from the ECUs 22 and 23, and calculates the degree of matching (e.g., the matching rate) between the shape information and map information that has been stored in advance. Then, the ECU 20 calculates the degree of reliability based on this degree of matching. For example, the degree of matching may also be treated as the degree of reliability as-is. Furthermore, the ECU 20 may also calculate the recognition accuracy of a demarcation line (white line) of the lane acquired from the ECUs 22 and 23, and may set the degree of matching to a lower value if it is determined that the recognition accuracy is low. For example, if the white line is thin, the luminance value of the pixels of the white line portion in a captured image will be low. If the shape information of the travel path of the vehicle 1 is to be acquired based on the position of the white line, the reliability of the shape information itself will decrease, and therefore, in such a case, the degree of matching with the map information is also corrected to a value that is lower than that in the case where the white line is not thin.

Alternatively, the ECU 20 acquires information of a sign on the travel path of the vehicle 1 based on the surrounding area information acquired from the ECUs 22 and 23, and acquires distance information of a distance from the vehicle 1 to the sign. Then, the ECU 20 may also calculate the degree of reliability based on the degree of matching (e.g., the matching rate) between that distance information and distance information of a distance to the sign obtained based on the map information stored in advance. Similarly, the degree of matching may also be treated as the degree of reliability as-is.

Furthermore, the ECU 20 may also acquire the position information of the vehicle 1 based on information received from a satellite such as a GPS satellite or a GNSS satellite, and calculate the degree of reliability based on the number of satellites from which a signal was received. For example, the number of GPS satellites may also be treated as the degree of reliability. In this case, the ECU 20 can determine that the map matching accuracy is favorable if the number of GPS satellites is a predetermined number or more. Also, the ECU 20 may acquire the position information of the vehicle 1 based on information received from a base station installed on the ground and calculate the degree of reliability based on the number of base stations from which a signal was received. Similarly, the number of base stations may also be treated as the degree of reliability. In this case, the ECU 20 can determine that the map matching accuracy is favorable if the number of base stations is a predetermined number or more.

In this manner, if it is determined that the map matching accuracy is favorable in step S105, the processing advances to step S106. On the other hand, if it is determined that the map matching accuracy is not favorable, the processing advances to step S107.

In step S106, the ECU 20 performs control for suppressing operation of a lane deviation suppression function. The land deviation suppression function is a function of performing steering assistance such that the vehicle 1 stays in the lane w % ben the vehicle 1 approaches the boundary of the travel path and starts to deviate from the lane, and outputting a deviation warning. The deviation warning may be, for example, a sound or a vibration that prompts attention, and may be an audio message such as "Vehicle is starting to deviate from lane". The deviation warning can be output via the input/output apparatus 9 due to the ECU 20 controlling the ECU 28. For example, when the vehicle 1 approaches the boundary of the lane, first, slight steering assistance (slight automatic steering of the steering apparatus) is performed, a warning is output, the steering apparatus is further vibrated, and thereafter strong steering assistance (significant automatic steering of the steering apparatus) is performed, and thereby a series of control assistance can be performed so as not to deviate from the current travel path.

Here, suppression of the operation can be realized by, for example, causing the lane deviation suppression function to operate when the distance from the vehicle 1 to the boundary of the lane approaches a first distance during normal operation, and causing a lane deviation suppression function to operate when the distance from the vehicle 1 to the boundary of the lane approaches a second distance that is shorter than the first distance during suppression.

In step S107, the ECU 20 performs control for causing normal operation of the lane deviation suppression function. The normal operation can be realized by causing the lane deviation suppression function to operate when the distance from the vehicle 1 to the boundary of the lane has approached a first value in the example of step S106.

In step S108, the ECU 20 determines whether or not the automatic driving state of the vehicle 1 has ended. If it has not ended, the processing returns to step S102, and the series of processing is continued. Note that the series of processing is repeatedly performed for, for example, about 10 [msecs] or a period shorter than that. On the other hand, if the automatic driving state is to be ended, the ECU 20 ends the series of processing.

Note that the steps of the present flowchart may also be changed without deviating from the gist of the present invention, and for example, the order of the steps may be changed, some of the steps may be omitted, and other steps may be added.

For example, although an example has been described in which both the determination processing of step S104 and the determination processing of step S105 are carried out, it is also possible to use a configuration in which only one is carried out. Alternatively, it is also possible to use a configuration in which processing that branches from step S103 to step S106 or step S107 is carried out without carrying out steps S104 and S105.

As described above, in the present embodiment, if the vehicle 1 is in a second state in which gripping of the steering apparatus by the driver is not needed, output of the deviation warning that is to be generated when the vehicle 1 has approached the boundary of the travel path is suppressed compared to the case where the vehicle 1 is in the first state in which gripping of the steering apparatus by the driver is needed.

When a lane deviation warning is generated in a state in which the steering apparatus is not being gripped, the driver cannot judge how to respond in some cases, but according to the present embodiment, it is possible to suppress a case in which the warning is output inadvertently, and therefore it is possible to reduce a sense of unease felt by the driver.

Also, in the present embodiment, if the vehicle 1 is in the second state in which gripping of the steering apparatus by the driver is not needed and an operation intervention of the steering apparatus is not being performed by the driver, output of a warning is suppressed compared to the case where an operation intervention is being performed. Accordingly, it is possible to suppress a case in which a warning is output inadvertently in a state in which the steering apparatus is not being gripped, and therefore it is possible to reduce a sense of unease felt by the driver.

Also, in the present embodiment, if the vehicle 1 is in the second state in which gripping of the steering apparatus by the driver is not needed and the map matching accuracy is favorable, output of the warning is suppressed. Accordingly, when the map matching accuracy is favorable, the automatic driving can be carried out accurately in a state in which the steering apparatus is not gripped, and therefore it is possible to suppress a state in which a warning is output inadvertently. Accordingly, it is possible to reduce a sense of unease felt by the driver.

Second Embodiment

In the present embodiment, an example will be described in which, if the vehicle 1 is in the second state in which gripping of the steering apparatus is not needed and a predetermined amount of time has elapsed since a steering operation of the steering apparatus ended, output of the deviation warning is suppressed compared to the case where the vehicle 1 is in the second state and the predetermined amount of time has not elapsed since the steering operation of the steering apparatus ended. Note that in the present embodiment, the second state in which gripping of the steering apparatus is not needed is a state in which the steering apparatus can be gripped intentionally by the driver. Also, even if the steering apparatus is gripped intentionally by the driver in the second state in which gripping of the steering apparatus is not needed, it is possible to continue the function of the vehicle 1 in the second state. The configurations of the vehicle and the vehicle control apparatus according to the present embodiment are similar to those of the first embodiment, and therefore description thereof is omitted.

Processing

Figure 3:
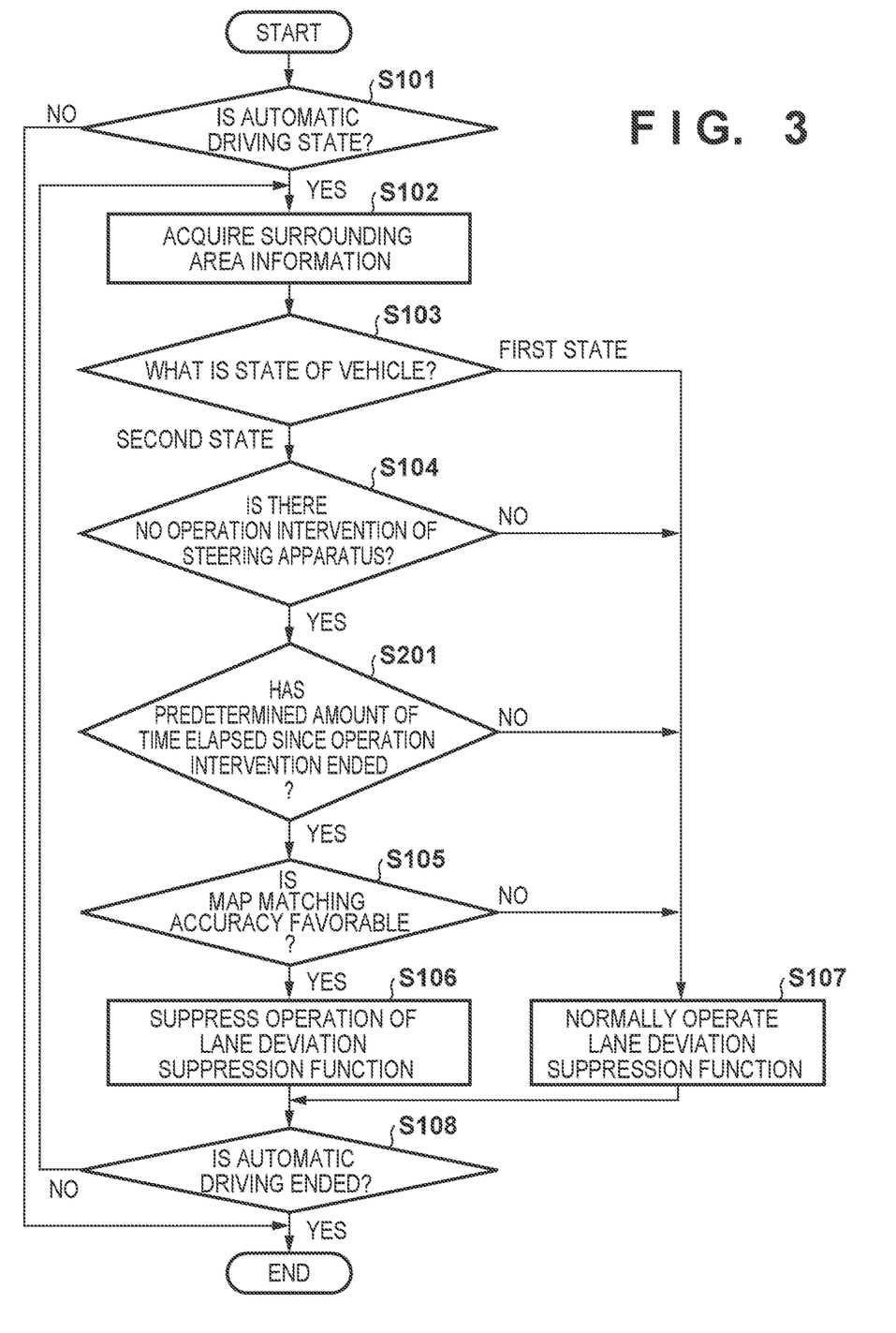
FIG. 3 is a flowchart showing an example of automatic driving processing according to a second embodiment.

FIG. 3 is a flowchart showing a procedure of processing implemented by the vehicle control apparatus according to the present embodiment. The processing content of this flowchart is mainly performed by the ECU 20. Steps denoted by the same reference numerals as the flowchart shown in FIG. 2 are the same as in the processing described with reference to FIG. 2, and therefore description thereof is omitted.

In step S104, if it has been determined that an intervention operation is being performed by the driver of the vehicle 1 on the steering apparatus (e.g., the steering wheel 31), the processing advances to step S107. On the other hand, if an intervention operation has not been performed, the processing advances to step S201.

In step S201, the ECU 20 determines whether or not a predetermined time has elapsed since the intervention operation performed by the driver of the vehicle 1 on the steering apparatus ended. If a predetermined amount of time has elapsed, the processing advances to step S105. On the other hand, if a predetermined amount of time has not elapsed, the processing advances to step S107.

Note that the steps of the present flowchart may also be changed without deviating from the gist of the present invention, and for example, the order of the steps may be changed, some of the steps may be omitted, and other steps may be added.

As described above, in the present embodiment, even if there is no intervention operation performed by the driver on the steering apparatus, if a predetermined amount of time has elapsed since the intervention operation was last performed, output of the deviation warning is suppressed. That is, even if an intervention operation has not been detected, control is performed in which suppression of the operation is not performed immediately after the intervention operation, and the suppression of the operation is delayed.

Accordingly, since there is a possibility of lane deviation in particular immediately after an intervention operation is performed by the driver on the steering apparatus, it is possible to perform normal operation even if an intervention operation has not been detected.

Note that although an example was described in which it is determined whether or not the predetermined amount of time has elapsed after the intervention operation ended in step S201 of the present embodiment, it is also possible to determine whether or not a predetermined distance has been traveled after the end of the intervention operation.

For example, in step S201, the ECU 20 determines whether or not the vehicle 1 has traveled a predetermined distance since the intervention operation performed by the driver of the vehicle 1 on the steering apparatus ended, and if a predetermined distance has been traveled, the processing advances to step S105, and if a predetermined distance has not been traveled, the processing advances to step S107.

Third Embodiment

In the present embodiment, an example will be described in which, if the vehicle is in the second state in which gripping of the steering apparatus is not needed and a predetermined amount of time has elapsed after the degree of reliability of the position information of the vehicle 1 transitions from being less than a predetermined value to being a predetermined value or more, output of the deviation warning is suppressed compared to a case where the vehicle is in the second state and a predetermined amount of time has not elapsed after the degree of reliability has transitioned from being less than a predetermined value to being a predetermined value or more.

The configurations of the vehicle and the vehicle control apparatus according to the present embodiment are similar to those of the first embodiment, and therefore description thereof is omitted.

Processing

Figure 4:
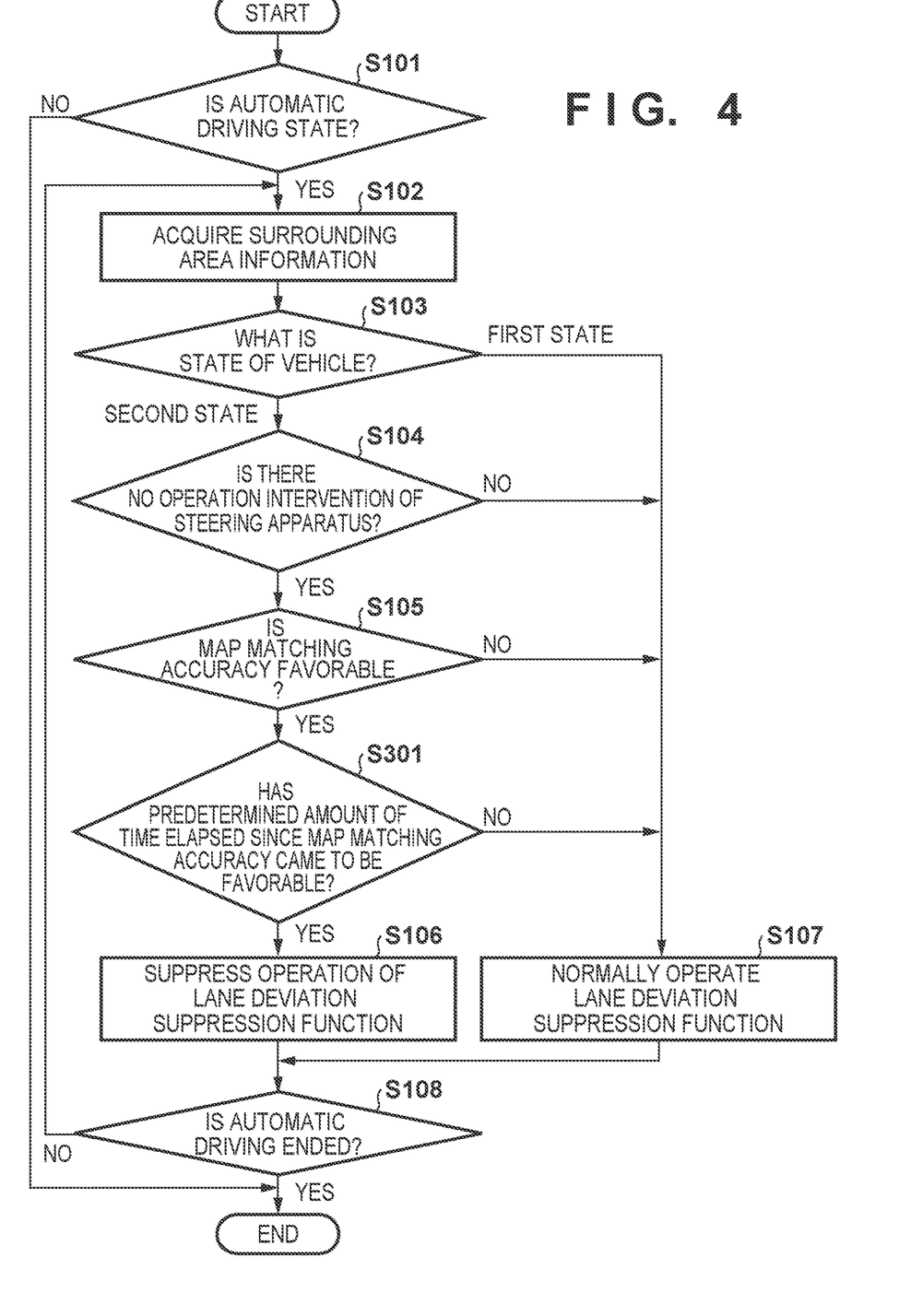
FIG. 4 is a flowchart showing an example of automatic driving processing according to a third embodiment.

FIG. 4 is a flowchart showing a procedure of processing implemented by the vehicle control apparatus according to the present embodiment. The processing content of this flowchart is mainly performed by the ECU 20. Steps denoted by the same reference numerals as the flowchart shown in FIG. 2 are the same as in the processing described with reference to FIG. 2, and therefore description thereof is omitted.

In step S105, the ECU 20 determines whether or not the map matching accuracy is favorable. Specifically, the ECU 20 calculates the degree of reliability of the position information of vehicle 1 based on the surrounding area information and determines that the map matching accuracy is not favorable if the calculated degree of reliability is less than a predetermined value, and the processing advances to step S107. On the other hand, if the degree of reliability is a predetermined value or more, the ECU 20 determines that the map matching accuracy is favorable, and the processing advances to step S301.

In step S301, the ECU 20 determines whether or not a predetermined amount of time has elapsed since a transition was made to a state in which the map matching accuracy is favorable. For example, it is determined whether or not a predetermined amount of time has elapsed since the degree of reliability of the position information of the vehicle 1 transitioned from being less than a predetermined value to being a predetermined value or more. If it is determined that a predetermined amount of time has elapsed after the transition, the processing advances to step S106. On the other hand, if it is determined that a predetermined amount of time has not elapsed, the processing advances to step S107.

Note that the steps of the present flowchart may also be changed without deviating from the gist of the present invention, and for example, the order of the steps may be changed, some of the steps may be omitted, and other steps may be added.

As described above, according to the present embodiment, even in a state in which the map matching accuracy is favorable, if a predetermined amount of time has elapsed since a transition was made to the favorable state, the deviation warning can be caused to operate normally in preparation for an unforeseen circumstance, and therefore it is possible to improve safety.

Note that in step S301 of the present embodiment, an example was described in which it is determined whether or not a predetermined amount of time has elapsed after a transition is made to a state in which the map matching accuracy is favorable, but it is also possible to determine whether or not a predetermined distance has been traveled after the transition.

For example, in step S301, the ECU 20 may also determine whether or not the vehicle 1 has traveled a predetermined distance after a transition was made to a state in which the map matching accuracy is favorable, and if the predetermined distance has been traveled, the processing may advance to step S106, and if the predetermined distance has not been traveled, the processing may advance to step S107.

Variations

Although the above-described embodiment described an example in which a deviation warning is output when the vehicle 1 has approached the boundary of the travel path, it is also possible to perform notification for prompting gripping of the steering apparatus to the driver instead of or in addition to outputting a deviation warning. That is, if the vehicle 1 has approached a predetermined distance from the boundary of the travel path in a case where the vehicle 1 is in a second state in which gripping of the steering apparatus is not needed, it is also possible to perform notification for requesting the driver to grip the steering apparatus. For example, the audio message "Please grip steering apparatus (wheel)" may also be output.

Note that if the vehicle 1 is a second state in which gripping of the steering apparatus is not needed, it is thought that the output timings of the output of the deviation warning and the notification of the request to grip the steering apparatus will coincide with each other. In such a case, the ECU 20 may also give priority to the notification of the request to grip the steering apparatus. Since this makes it possible to cause the driver to grip the gripping apparatus earlier, it is possible to further improve the safety.

According to the present invention, it is possible to suppress output of an excessive deviation warning in a state in which gripping of the steering apparatus is not needed. Accordingly, it is possible to reduce a sense of unease felt by the driver.

Summary of Embodiments

A vehicle control apparatus (e.g., 2) according to a first aspect is
  a vehicle control apparatus for controlling a vehicle (e.g., 1) based on surrounding area information of the vehicle, including:
  a control unit (e.g., 20) capable of controlling the vehicle in a first state in which gripping of a steering apparatus (e.g., 31) by a driver of the vehicle is needed and a second state in which the gripping is not needed, based on the surrounding area information; and
  a warning output unit (e.g., 9, 20, 28) configured to output a deviation warning when the vehicle has approached a boundary of a travel path,
  in which if the vehicle is in the second state, the control unit suppresses output of the deviation warning performed by the warning output unit compared to a case where the vehicle is in the first state.

According to the first aspect, it is possible to suppress output of an excessive deviation warning in a state in which gripping of the steering apparatus is not needed. Accordingly, it is possible to reduce a sense of unease felt by the driver.

In a vehicle control apparatus (e.g., 2) according to a second aspect,
if the vehicle is in the second state and a steering operation performed by the driver on the steering apparatus has not been detected, the control unit suppresses output of the deviation warning performed by the warning output unit compared to a case where the vehicle is in the second state and the steering operation has been detected.

According to the second aspect, it is possible to suppress a case in which a warning is output inadvertently in a state in which the steering apparatus is not being gripped, and therefore it is possible to reduce a sense of unease felt by the driver.

In a vehicle control apparatus (e.g., 2) according to a third aspect,
the control unit calculates a degree of reliability of position information of the vehicle based on the surrounding area information, and
if the degree of reliability is a predetermined value or more, the control unit suppresses output of the deviation warning performed by the warning output unit compared to a case where the degree of reliability is less than the predetermined value.

According to the third aspect, if the degree of reliability of the position information of the vehicle is high, automatic driving can be carried out accurately in a state in which the steering apparatus is not gripped, and therefore it is possible to suppress a case in which a warning is output inadvertently. Accordingly, it is possible to reduce a sense of unease felt by the driver.

In a vehicle control apparatus (e.g., 2) according to a fourth aspect,
the control unit acquires shape information of the travel path based on the surrounding area information, and calculates the degree of reliability based on a degree of matching between the shape information and map information stored in advance.

According to the fourth aspect, the shape of the travel path can be acquired by analyzing an image of the surrounding area of the vehicle acquired by an apparatus such as a camera in the vehicle, or the like, and it is possible to determine the degree to which the shape and the map match by comparing the two. It can be said that the more the two match, the higher the degree of reliability is.

In a vehicle control apparatus (e.g., 2) according to a fifth aspect,
the control unit acquires information of a sign on the travel path from the surrounding area information and acquires distance information of a distance to the sign, and
the control unit calculates the degree of reliability based on the degree of matching between the distance information and distance information of the distance to the sign obtained based on map information stored in advance.

According to the fifth embodiment, by comparing information of a sign detected by analyzing an image of the surrounding area of the vehicle acquired by an apparatus such as a camera in the vehicle or the like, using the sign as a key, it is possible to determine the degree to which the two match.

In a vehicle control apparatus (e.g., 2) according to a sixth aspect,
the control unit acquires the position information of the vehicle based on information received from a satellite or information received from a base station installed on the ground, and calculates the degree of reliability based on the number of the satellites or the number of the base stations.

According to the sixth aspect, it is possible to calculate the degree of reliability of the position information of the vehicle based on the number of satellites or base stations from which signals were received. In general, the greater the number of satellites or the number of base stations from which signals were received is, the higher the degree of reliability of the position information is.

In a vehicle control apparatus (e.g., 2) according to a seventh aspect, if the vehicle is in the second state and a predetermined amount of time has elapsed since a steering operation performed by the driver on the steering apparatus ended, the control unit suppresses output of the deviation warning performed by the warning output unit compared to a case where the vehicle is in the second state and a predetermined amount of time has not elapsed since the steering operation on the steering apparatus ended (e.g., step S201).

According to the seventh aspect, there is a possibility of lane deviation in particular immediately after an intervention operation is performed on the steering apparatus by the driver, and therefore it is possible to perform normal operation even if no intervention operation is being detected. On the other hand, since the likelihood of lane deviation decreases if a certain amount of time has elapsed since an intervention operation was performed, it is possible to suppress excessive warning output.

In a vehicle control apparatus (e.g., 2) according to an eighth aspect,
if the vehicle is in the second state and has traveled a predetermined distance since a steering operation performed by the driver on the steering apparatus ended, the control unit suppresses output of the deviation warning performed by the warning output unit compared to a case where the vehicle is in the second state and has not traveled a predetermined distance since the steering operation on the steering apparatus ended.

According to the eighth aspect, there is a possibility of lane deviation in particular immediately after an intervention operation is performed on the steering apparatus by the driver, and therefore it is possible to perform normal operation even if no intervention operation is being detected. On the other hand, since the likelihood of lane deviation decreases if a certain amount of time has elapsed since an intervention operation was performed, it is possible to suppress excessive warning output.

In a vehicle control apparatus (e.g., 2) according to a ninth aspect,
if the vehicle is in the second state and a predetermined amount of time has elapsed since the degree of reliability transitioned from being less than the predetermined value to being the predetermined value or more, the control unit suppresses output of the deviation warning performed by the warning output unit compared to a case where the vehicle is in the second state and a predetermined amount of time has not elapsed since the degree of reliability transitioned from being less than the predetermined value to being the predetermined value or more (e.g., step S301).

According to the ninth aspect, even if the vehicle is currently in a state in which the degree of reliability of the position information of the vehicle is high, if a predetermined amount of time has not elapsed since a transition was made from a state in which the degree of reliability is low to a state in which the degree of reliability is high, it is possible to cause the deviation warning to operate normally in preparation for an unforeseen circumstance, and therefore it is possible to improve safety.

In a vehicle control apparatus (e.g., 2) according to a tenth aspect,
if the vehicle is in the second state and has traveled a predetermined distance since the degree of reliability transitioned from being less than the predetermined value to being the predetermined value or more, the control unit suppresses output of the deviation warning performed by the warning output unit compared to a case where the vehicle is in the second state and has not traveled a predetermined distance since the degree of reliability transitioned from being less than the predetermined value to being the predetermined value or more.

According to the tenth aspect, even if the vehicle is currently in a state in which the degree of reliability of the position information of the vehicle is high, if traveling has been performed to a certain extent and an amount of time has not elapsed since a transition was made from the state in which the degree of reliability is low to the state in which the degree of reliability is high, it is possible to cause the deviation warning to operate normally in preparation for an unforeseen circumstance, and therefore it is possible to improve safety.

A vehicle control apparatus (e.g., 2) according to an eleventh aspect
further includes a notification unit (e.g., 9, 20, 28) configured to, in a case where the vehicle is in the second state and a steering operation performed by the driver on the steering apparatus is not being detected, perform notification for requesting the driver to grip the steering apparatus if the vehicle has approached a predetermined distance with respect to the boundary of the travel path.

According to the eleventh aspect, it is possible to request gripping of the steering apparatus at an early time when the boundary of the travel path has been approached.

In a vehicle control apparatus (e.g., 2) according to a twelfth aspect,
if output of the deviation warning performed by the warning output unit and output of a request to grip the steering apparatus performed by the notification unit coincide with each other, the control unit gives priority to notification of the request to grip performed by the notification unit.

According to the twelfth aspect, it is possible to cause the driver to grip the gripping apparatus at an early time before prompting the attention of the driver with the deviation warning, and therefore it is possible to further improve safety.

A vehicle (e.g., 1) according to a thirteenth aspect
includes the vehicle control apparatus according to any one of the first to twelfth aspects.

According to the thirteenth aspect, it is possible to suppress excessive output of the deviation warning in a state in which gripping of the steering apparatus is not needed, and therefore it is possible to realize automatic driving that reduces a sense of unease felt by the driver in the vehicle.

An operation method for a vehicle control apparatus (e.g., 2) according to a fourteenth aspect is
an operation method for a vehicle control apparatus for controlling a vehicle (e.g., 1) based on surrounding area information of the vehicle, the method including:
a control step of controlling the vehicle in a first state in which gripping of a steering apparatus (e.g., 31) by a driver of the vehicle is needed and a second state in which the gripping is not needed, based on the surrounding area information;
a warning output step of outputting a deviation warning when the vehicle has approached a boundary of a travel path; and
a suppression step of, if the vehicle is in the second state, suppressing output of the deviation warning performed by the warning output unit compared to a case where the vehicle is in the first state.

According to the fourteenth aspect, it is possible to suppress excessive output of the deviation warning in a state in which gripping of the steering apparatus is not needed. Accordingly, it is possible to reduce a sense of unease felt by the driver.

A program according to a fifteenth aspect is
a program for causing a computer to function as the vehicle control apparatus according to any one of the first to twelfth aspects.

According to the fifteenth aspect, the operations of the vehicle control apparatus according to any one of the first to twelfth aspects can be realized by a computer.

Other

Also, a program for realizing one or more of the functions described in the embodiments can be supplied to a system or an apparatus via a network or a storage medium, and one or more processor in a computer of the system or the apparatus can read out and execute the program. The present invention can be realized through such a mode as well.

The invention is not limited to the foregoing embodiments, and various variations/changes are possible within the spirit of the invention.

What is claimed is:

1. A vehicle control apparatus for controlling a vehicle based on surrounding area information of the vehicle, comprising:
a control unit capable of controlling the vehicle in a first state in which gripping of a steering apparatus by a driver of the vehicle is needed and a second state in which the gripping is not needed, based on the surrounding area information; and
a warning output unit configured to output a deviation warning when the vehicle has approached a boundary of a travel path,
wherein if the vehicle is in the second state, the control unit suppresses output of the deviation warning performed by the warning output unit compared to a case where the vehicle is in the first state,
wherein the control unit calculates a degree of reliability of position information of the vehicle based on the surrounding area information, and
if the degree of reliability is a predetermined value or more, the control unit suppresses output of the deviation warning performed by the warning output unit compared to a case where the degree of reliability is less than the predetermined value,
wherein the control unit determines whether or not the degree of reliability transitions from being less than the predetermined value to being the predetermined value or more, if the vehicle is in the second state and a predetermined amount of time has elapsed since the degree of reliability transitioned from being less than the predetermined value to being the predetermined value or more, the control unit suppresses output of the deviation warning performed by the warning output unit compared to a case where the vehicle is in the second state and a predetermined amount of time has not elapsed since the degree of reliability transitioned from being less than the predetermined value to being the predetermined value or more.

2. The vehicle control apparatus according to claim 1, wherein if the vehicle is in the second state and a steering operation performed by the driver on the steering apparatus has not been detected, the control unit suppresses output of the deviation warning performed by the warning output unit compared to a case where the vehicle is in the second state and the steering operation has been detected.

3. The vehicle control apparatus according to claim 1, wherein the control unit acquires shape information of the travel path based on the surrounding area information, and calculates the degree of reliability based on a degree of matching between the shape information and map information stored in advance.

4. The vehicle control apparatus according to claim 1,
wherein the control unit acquires information of a sign on the travel path from the surrounding area information and acquires distance information of a distance to the sign, and
the control unit calculates the degree of reliability based on the degree of matching between the distance information and distance information of the distance to the sign obtained based on map information stored in advance.

5. The vehicle control apparatus according to claim 1, wherein the control unit acquires the position information of the vehicle based on information received from a satellite or information received from a base station installed on the ground, and calculates the degree of reliability based on L number of the satellites or L number of the base stations.

6. The vehicle control apparatus according to claim 1, wherein if the vehicle is in the second state and a predetermined amount of time has elapsed since a steering operation performed by the driver on the steering apparatus ended, the control unit suppresses output of the deviation warning performed by the warning output unit compared to a case where the vehicle is in the second state and a predetermined amount of time has not elapsed since the steering operation on the steering apparatus ended.

7. The vehicle control apparatus according to claim 1, wherein if the vehicle is in the second state and has traveled a predetermined distance since a steering operation performed by the driver on the steering apparatus ended, the control unit suppresses output of the deviation warning performed by the warning output unit compared to a case where the vehicle is in the second state and has not traveled a predetermined distance since the steering operation on the steering apparatus ended.

8. The vehicle control apparatus according to claim 1, wherein if the vehicle is in the second state and has traveled a predetermined distance since the degree of reliability transitioned from being less than the predetermined value to being the predetermined value or more, the control unit suppresses output of the deviation warning performed by the warning output unit compared to a case where the vehicle is in the second state and has not traveled a predetermined distance since the degree of reliability transitioned from being less than the predetermined value to being the predetermined value or more.

9. The vehicle control apparatus according to claim 1, further comprising a notification unit configured to, in a case where the vehicle is in the second state and a steering operation performed by the driver on the steering apparatus is not being detected, perform notification for requesting the driver to grip the steering apparatus if the vehicle has approached a predetermined distance with respect to the boundary of the travel path.

10. The control apparatus according to claim 9, wherein if output of the deviation warning performed by the warning output unit and output of a request to grip the steering apparatus performed by the notification unit coincide with each other, the control unit gives priority to notification of the request to grip performed by the notification unit.

11. A vehicle comprising the vehicle control apparatus according to claim 1.

12. An operation method for a vehicle control apparatus for controlling a vehicle based on surrounding area information of the vehicle, the method comprising:
a control step of controlling the vehicle in a first state in which gripping of a steering apparatus by a driver of the vehicle is needed and a second state in which the gripping is not needed, based on the surrounding area information;
a warning output step of outputting a deviation warning when the vehicle has approached a boundary of a travel path; and
a suppression step of, if the vehicle is in the second state, suppressing the output of the deviation warning as compared to a case where the vehicle is in the first state,
wherein a degree of reliability of position information of the vehicle is calculated based on the surrounding area information, and
if the degree of reliability is a predetermined value or more, the output of the deviation warning is suppressed as compared to a case where the degree of reliability is less than the predetermined value,
wherein determining whether or not the degree of reliability transitions from being less than the predetermined value to being the predetermined value or more, if the vehicle is in the second state and a predetermined amount of time has elapsed since the degree of reliability transitioned from being less than the predetermined value to being the predetermined value or more, the output of the deviation warning is suppressed as compared to a case where the vehicle is in the second state and a predetermined amount of time has not elapsed since the degree of reliability transitioned from being less than the predetermined value to being the predetermined value or more.

13. A non-transitory computer-readable storage medium storing a program for causing a computer to function as the vehicle control apparatus according to claim 1.

* * * * *